(12) United States Patent
Kneer et al.

(10) Patent No.: US 12,166,225 B2
(45) Date of Patent: Dec. 10, 2024

(54) CELL HOLDER AND BATTERY PACK COMPRISING A CELL HOLDER

(71) Applicant: Robert Bosch GmbH, Stuttgart (DE)

(72) Inventors: Florian Kneer, Duernau (DE); Josef Baumgartner, Wildberg (DE)

(73) Assignee: Robert Bosch GmbH, Stuttgart (DE)

( * ) Notice: Subject to any disclaimer, the term of this patent is extended or adjusted under 35 U.S.C. 154(b) by 112 days.

(21) Appl. No.: 17/652,630

(22) Filed: Feb. 25, 2022

(65) Prior Publication Data

US 2022/0278407 A1  Sep. 1, 2022

(30) Foreign Application Priority Data

Feb. 26, 2021 (DE) ..................... 10 2021 104 625.4

(51) Int. Cl.
*H01M 50/213* (2021.01)
*H01M 50/247* (2021.01)
*H01M 50/264* (2021.01)

(52) U.S. Cl.
CPC ....... *H01M 50/213* (2021.01); *H01M 50/247* (2021.01); *H01M 50/264* (2021.01); *H01M 2220/30* (2013.01)

(58) Field of Classification Search
CPC .................................................. H01M 50/213
See application file for complete search history.

(56) References Cited

U.S. PATENT DOCUMENTS

| 9,190,641 B2 | 11/2015 | Bae |
| 2014/0283360 A1* | 9/2014 | Takeda ................ H01M 50/249 29/515 |
| 2014/0287288 A1 | 9/2014 | Takeda et al. |
| 2020/0220122 A1* | 7/2020 | Haertel ............... H01M 50/505 |

FOREIGN PATENT DOCUMENTS

| DE | 10 2015 218 447 A1 | 6/2016 |
| DE | 10 2015 225 565 A1 | 6/2017 |
| WO | 2019/208157 A1 | 10/2019 |

* cited by examiner

*Primary Examiner* — Barbara L Gilliam
*Assistant Examiner* — Jordan E Berresford
(74) *Attorney, Agent, or Firm* — Maginot, Moore & Beck LLP

(57) ABSTRACT

A cell holder for at least two battery cells includes at least two battery-cell receivers, each battery-cell receiver configured to receive a single battery cell. The battery-cell receivers each including a rigid region and a flexible region. The flexible region is arranged partially or entirely in the rigid region.

15 Claims, 7 Drawing Sheets

CELL HOLDER AND BATTERY PACK COMPRISING A CELL HOLDER

This application claims priority under 35 U.S.C. § 119 to patent application no. DE 10 2021 104 625.4, filed on Feb. 26, 2021 in Germany, the disclosure of which is incorporated herein by reference in its entirety.

BACKGROUND

A battery pack for a hand-held power tool is described in DE 10 2015 218 447 A1.

SUMMARY

The disclosure relates to a cell holder for at least two battery cells, comprising at least two battery-cell receivers designed to receive a single battery cell, the battery-cell receivers each comprising a rigid region and a flexible region. It is proposed that the flexible region be arranged partially or entirely in the rigid region. Advantageously, a particularly dimensionally stable cell holder can thus be realized.

The cell holder is designed in particular for a battery pack. The battery pack is in particular part of a system composed of the battery pack and a load, the load being supplied with power during operation via the battery pack. The battery pack is realized in particular as a battery pack for a hand-held power tool. The battery pack is in particular realized as an exchangeable battery pack. The battery pack is in particular designed to be connectable to a charging device for charging the battery pack.

The battery pack has a housing in which the battery cell is arranged, the housing being realized as an outer housing. The battery pack, in particular the housing of the battery pack, can be detachably connected to the load and/or a charging device via a mechanical interface. The housing of the battery pack may have one or more housing parts. Preferably, the cell holder is realized as one of the housing parts. The housing parts are connected to each other in a non-positive, positive and/or materially bonded manner. The cell holder is preferably made of a plastic, in particular a thermoplastic. The cell holder may partially form the outer housing of the battery pack. The cell holder is preferably realized as a single part or as a single piece. In the context of this application, as a single piece is to be understood to mean in particular a component that is realized from one piece and is not realized from a plurality of components that are joined to one another in a materially bonded and/or non-positive and/or positive manner. Accordingly, a single-piece component is composed of a single material. In the context of this application, as a single part is to be understood to mean in particular a single-piece component, or plurality of components, that are joined to one another in a materially bonded manner, for example by means of a two-component injection molding process. Alternatively, it is also conceivable for the cell holder to be of a multipart design, in which case the different parts are joined to each other in a non-positive and/or positive manner.

Alternatively, it is also conceivable for the battery-cell receivers to be realized in such a manner that two or more battery cells can be received in them. In particular, the battery-cell receiver is realized in such a manner that, when connected to the battery cell, a large part of the outer surface, in particular a large part of the circumferential surface of the battery cell, is enclosed by the battery-cell receiver. In particular, at least 60%, preferably at least 75%, preferably at least 90%, of the circumferential surface of the battery cell is enclosed by the battery-cell receiver. Advantageously, good heat dissipation can thus be realized. In particular, a shape of the battery-cell receiver corresponds substantially to a shape of the battery cells to be received. The battery-cell receiver is preferably designed for the largest battery cell to be expected. In the battery-cell receiver, the battery cell thus bears in particular only with a line contact against the battery-cell receiver and/or against the resilient arm.

The flexible region is realized in such a manner that, taking into account a production tolerance of the battery cells, it can be fixed in the battery-cell receiver in a non-positive manner. The flexible region is thus of a size that can be adapted. In particular, the rigid region is realized in such a manner that its size is non-dependent on the size of the flexible region. In particular, the flexible region is a part of the rigid region, the proportion of the flexible region depending on the size of the battery cell.

The load may be realized, in particular, as a garden appliance such as, for example, a lawn mower or hedge trimmer, as a household appliance such as, for example, an electric window cleaner or hand-held vacuum cleaner, as a hand-held power tool such as, for example, an angle grinder, a screwdriver, a power drill, a hammer drill, etc., or as an electric means of transport such as, for example, a pedelec or e-bike, or as a measuring tool such as, for example, a laser distance measuring device. Furthermore, it is also conceivable for the load to be realized as another device, in particular a portable device such as, for example, a construction site light, a suction extraction device or a construction site radio.

The battery pack can be connected to the load in a non-positive and/or positive manner via a mechanical interface. Advantageously, the mechanical interface comprises at least one actuating element via which the connection of the battery pack to the load and/or to the charging device can be released. The actuating element may be realized, for example, as a button, lever or push-button. In addition, the battery pack has at least one electrical interface via which the battery pack can be electrically connected to the load and/or to the charging device. The battery pack can be charged and/or discharged, for example, via the electrical connection. Alternatively or additionally, it is also conceivable that information can be transmitted via the electrical interface. The electrical interface is preferably realized as a contact interface in which the electrical connection is made via a physical contact between at least two conductive components. The electrical interface preferably comprises at least two electrical contact elements. In particular, one of the electrical contact elements is realized as a plus contact and the other electrical contact element is realized as a minus contact. In addition, the electrical interface may have at least one additional contact that is designed to transmit additional information to the load and/or to the charging device. Alternatively or additionally, the electrical interface may have a secondary charging coil element for inductive charging. Furthermore, the at least one battery cell is arranged in the housing of the battery pack and can be electrically connected to the load via the electrical contact device.

The battery cell may be realized as a galvanic cell, having a structure in which one cell pole is located at one end and another cell pole is located at an opposite end. In particular, the battery cell has a positive cell pole at one end and a negative cell pole at an opposite end. Preferably, the battery cells are realized as NiCd or NiMh, and particularly preferably lithium-based battery cells or Li-Ion battery cells. The battery voltage of the battery pack is usually a multiple of the voltage of a single battery cell and results from the connection (parallel or serial) of the battery cells. In the case of common battery cells having a voltage of 3.6 V, this results in exemplary battery voltages of 3.6 V, 7.2 V, 10 V, 8 V, 14.4 V, 18 V, 36 V, 54 V, 108 V, etc. Preferably, the battery cell is realized as an at least substantially cylindrical round cell, with the cell poles arranged at the ends of the cylinder shape.

Furthermore, the battery pack preferably comprises a set of electronics. The set of electronics may comprise a memory unit on which information is stored. Additionally or alternatively, it is also conceivable for information to be ascertained by the set of electronics. The information may be, for example, a state of charge of the battery pack, a temperature within the battery pack, a coding or a residual capacity of the battery pack. It is also conceivable for the set of electronics to be designed to control the charging and/or discharging process of the battery pack by closed-loop or open-loop control. The set of electronics may comprise, for example, a computing unit, a control unit, a transistor, a capacitor, and/or the memory unit. The set of electronics may additionally comprise one or more sensor elements, for example, a temperature sensor for ascertaining the temperature within the battery pack, or a motion sensor for determining movements. The set of electronics may alternatively or additionally comprise a coding element such as, for example, a coding resistor.

It is furthermore proposed that arranged between a first flexible region of a first battery cell receiver and a second flexible region of a second battery cell receiver there is a support element, which is designed to mechanically stiffen the first battery cell receiver and the second battery cell receiver. Advantageously, the mechanical stability of the cell holder can thus be further improved. The support element is preferably realized as a single piece with the cell holder.

In addition, it is proposed that the support element be assigned to a first rigid region of the first battery-cell receiver and to a second rigid region of the second battery-cell receiver. The support element has in particular two opposite sides, the opposite sides delimiting different battery-cell receivers.

In addition, it is proposed that the flexible region and the rigid region be realized as a single part or as a single piece. It is thereby possible, advantageously, to realize inexpensive production.

It is furthermore proposed that the flexible region have a resilient arm, which is designed to fix the battery cell in the battery-cell receiver in a non-positive manner. The resilient arm is preferably realized as one piece with the cell holder. Alternatively, it is also conceivable for the resilient arm to be made of a material different from that of the cell holder, for example a hard plastic component, in particular TPE. It is thereby possible to improve the fixing.

In addition, it is proposed that the resilient arm be realized and arranged in such a manner that a distance of the resilient arm from the support element is dependent on a diameter of the battery cell. In particular, the resilient arm is realized in such a manner that a diameter of the flexible region is less than a minimum diameter of the battery cell within the scope of the production tolerance.

In addition, it is proposed that the battery-cell receivers each have at least one opening via which the battery cells can be received in the battery-cell receivers along a connection direction. The battery-cell receivers preferably each have a single opening that is arranged on an end face of the battery-cell receiver.

It is furthermore proposed that there be a cavity arranged between the resilient arm and the support element, a size of the cavity being dependent on the diameter of the battery cell. The cavity extends in particular uniformly along the connection direction.

In addition, it is proposed that the support element have a centering element for a cell connector on at least one end face. The cell connector is designed in particular for the electrical connection of at least one battery cell to the set of electronics and/or the electrical interface. The cell connector is preferably connected to one of the cell poles of the battery cell in a materially bonded manner, for example by means of a soldered connection or a welded connection.

The disclosure also relates to a battery pack comprising a cell holder as described above and comprising at least two battery cells. It is thereby possible, advantageously, to realize particularly advantageous fixing of the battery cells in the battery pack.

It is furthermore proposed that the resilient arm, in the connected state, bears against a, in particular single, battery cell. The spring arm is in particular realized in such a manner that the greater the diameter of the battery cell, the greater is the force exerted by the resilient arm upon the battery cell.

In addition, it is proposed that the support element extend along the connection direction. In particular, the support element is arranged at a distance from the battery cell.

BRIEF DESCRIPTION OF THE DRAWINGS

Further advantages are given by the following description of the drawings. The drawings, the description and the claims contain numerous features in combination. Persons skilled in the art will also expediently consider the features individually and combine them to create appropriate further combinations. References to features of different embodiments of the disclosure that are substantially the same are denoted by the same number and by a letter identifying the embodiment.

In the drawings.

DETAILED DESCRIPTION

Figure 1:
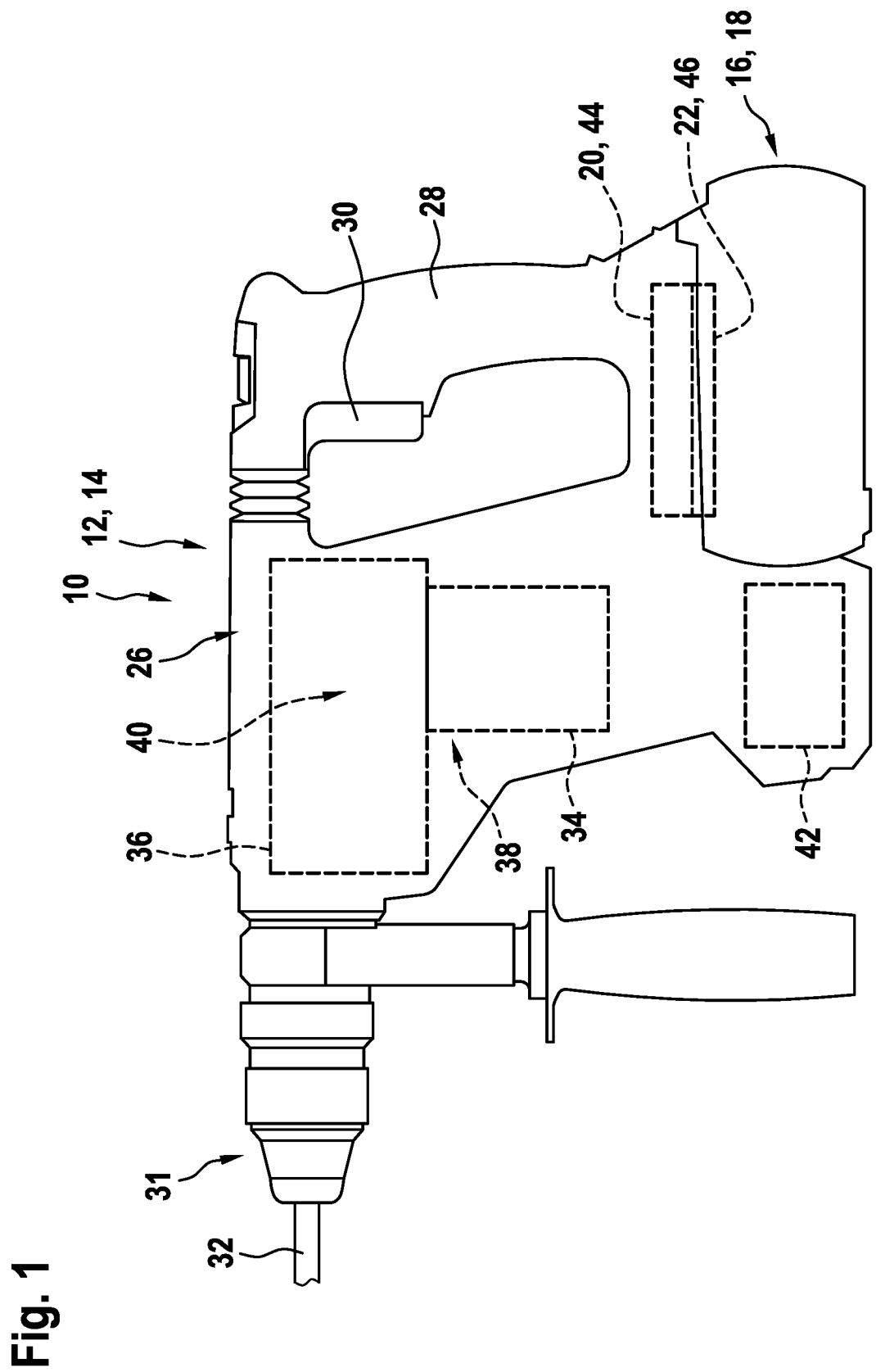
FIG. 1 shows a schematic side view of a hand-held power tool comprising a battery pack.

FIG. 1 shows a side view of a system 10 composed of a load 14 realized as a hand-held power tool 12 and of a battery pack 18 realized as a hand-held power-tool battery pack 16. The hand-held power tool 12 is thus realized as a battery-operated hand-held power tool and during operation is supplied with power via the battery pack 18. The hand-held power tool 12 and the battery pack 18 each have a mechanical interface 20, 22 via which the two components of the system 10 are detachably connected to each other. The battery pack 18 is thus realized as an exchangeable battery pack and can be replaced by an identical or similar battery pack. The hand-held power tool 12 is exemplarily realized as a hammer drill.

The hand-held power tool 12 has a housing 26, arranged at the rear end of which there is a handle 28 comprising an operating switch 30 for switching the hand-held power tool 12 on and off. Arranged at the front end of the housing 26 of the hand-held power tool 12 there is a tool receiver 31, which is designed to receive an insert tool 32. Arranged between the handle 28 and the tool receiver 31 there is a drive unit 38 that comprises an electric motor 34 and a transmission 36 is. The transmission 36 comprises an impact mechanism unit 40 and is arranged above the electric motor 34. The impact mechanism unit 40 comprises a pneumatic impact mechanism. Arranged beneath the electric motor 34 is a set of electronics 42, via which the hand-held power tool 12 can be controlled by closed-loop or open-loop control. The battery pack 18 is arranged beneath the handle 28 and adjacent to the set of electronics 42.

The battery pack 18 and the load 14 each have a mutually corresponding electrical interface 44, 46, via which the battery pack 18 can be electrically connected to the load 14, in particular to the set of electronics 42 of the load 14. When connected to each other, the battery pack 18 provides the power supply for the load 14.

Figure 2:
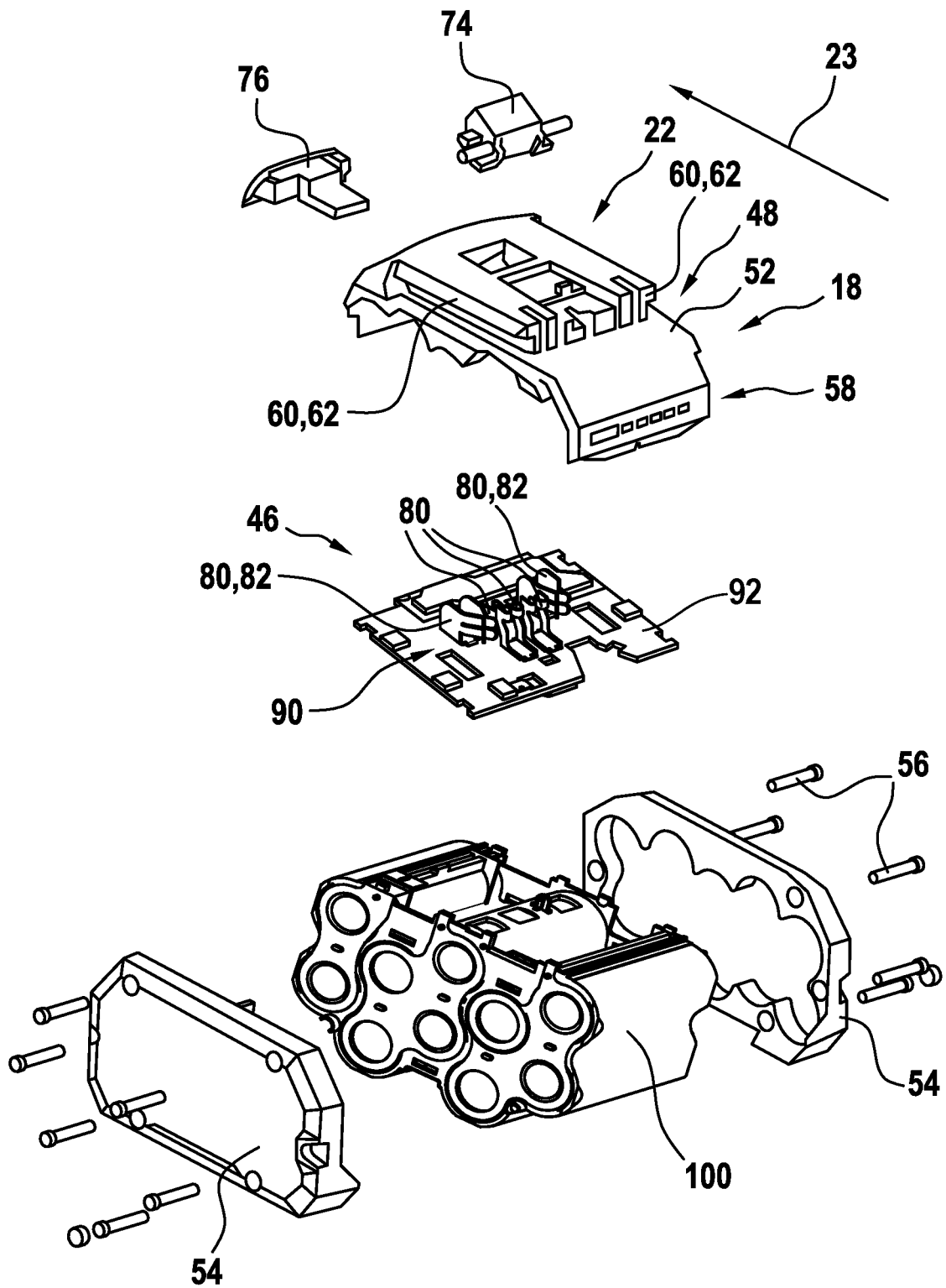
FIG. 2 shows a schematic exploded view of the battery pack.

FIG. 2 shows a schematic exploded view of the battery pack 18 according to the disclosure.

The battery pack 18 is mechanically connected to the load 14 in a detachable manner via the mechanical interface 22. The battery pack 18 has a battery pack housing 48, which for example is of a multipart design. The battery pack housing 48 is composed of a plastic housing material. Preferably, the battery pack housing 48 is made of a polycarbonate or a high-density polyethylene (HD PE). The battery pack housing 48 is realized in particular as an outer housing. The battery pack housing 48 is of a multipart design, for example. The battery pack housing 48 has a cell holder 100, an interface housing part 52 and two side housing parts 54. The housing parts 100 52, 54 are connected to each other via fastening elements 56, which exemplarily are realized as screws. The housing parts 100 52, 54 are all at least partially realized as outer housing parts.

Arranged on the front of the battery pack 18 there is a state-of-charge indicator 58, via which the state of charge of the battery pack 18 can be indicated. The battery pack housing 48 of the battery pack 18, in particular the interface housing part 52, comprises the mechanical interface 22. The battery pack 18 is exemplarily realized as a sliding battery pack. For the purpose of being connected to the hand-held power tool 12, the battery pack 18 is slid into the hand-held power tool 12 along a battery connection direction 23.

The mechanical interface 22 has a pair of holding elements 60 on which the battery pack 18 is held when connected to the hand-held power tool 12. The holding elements 60 are exemplarily realized as guide rails 62. The holding elements 60 extend substantially parallel to the battery connection direction 23 of the battery pack 18. When connected to the hand-held power tool 12, guide rails of the mechanical interface 20 of the hand-held power tool 12, which are not represented, bear against the guide rails 62. In addition, the mechanical interface 22 of the battery pack 18 has a locking element 74. The locking element 74 is mounted in a movable manner, in particular rotatably, in the battery pack housing 48 of the battery pack 18. The locking element 74 is designed to lock the battery pack 18 to the hand-held power tool 12 in the connected state. The locking element 74 is exemplarily realized as a latching element, which latches into a recess, not represented, in the housing 26 of the hand-held power tool 12. To release this non-positive and positive connection, the battery pack 18 has an operating element 76, which is mechanically coupled to the locking element 74 and via which, when in the connected state, the locking element 74 can be moved out of the recess. The operating element 76 is exemplarily realized as a push-button element and can be operated parallel to the connection direction 23.

The battery pack 18 exemplarily comprises ten battery cells 70 (see FIG. 3), which are arranged in the cell holder 100. The battery pack 18 is realized as an 18 V battery pack. The battery pack 18 is exemplarily realized as a two-layer battery pack 18. A two-layer battery pack 18 is to be understood in particular to mean that the battery cells 70 are arranged in two layers, with the battery cells 70 being arranged next to each another substantially on one level within a layer, and within a layer the number of battery cells 70 not being less than the number of layers. One layer comprises, for example, five battery cells 70. It is also conceivable for the battery pack 18 to be realized as a three-layer or four-layer battery pack. In addition, it is conceivable for a layer to have a different number of battery cells 70, for example 1 to 4 battery cells 70 or more than 5 battery cells.

The electrical interface 46 exemplarily has five electrical contact elements 80. In the assembled state, the five electrical contact elements 80 are arranged between the holding elements 60. The electrical contact elements 80 are designed at least partially for connection to electrical contact elements, not represented, of the electrical interface 44 of the hand-held power tool 12 or to a charging device, not represented. The interface housing 52 has recesses in which the electrical contact elements 80 are arranged and via which they are designed to be accessible for electrical connection. Two of the electrical contact elements 80 are realized as power contacts 82, via which an electrical current flows during operation to supply power to the hand-held power tool 12. Three of the electrical contact elements 80 are realized as additional contacts. One of the additional contacts is realized as a temperature contact for transmitting a temperature characteristic. The other two additional contacts are realized as coding contacts and are connected to a coding resistor.

The battery pack 18 also has a set of electronics 90 for controlling the battery pack 18 by open-loop or closed-loop. The set of electronics 90 comprises a printed circuit board 92 on which the electrical contact elements 80 are arranged. In addition, the circuit board comprises a computing unit, not represented, and a memory unit, not represented.

Figure 3:
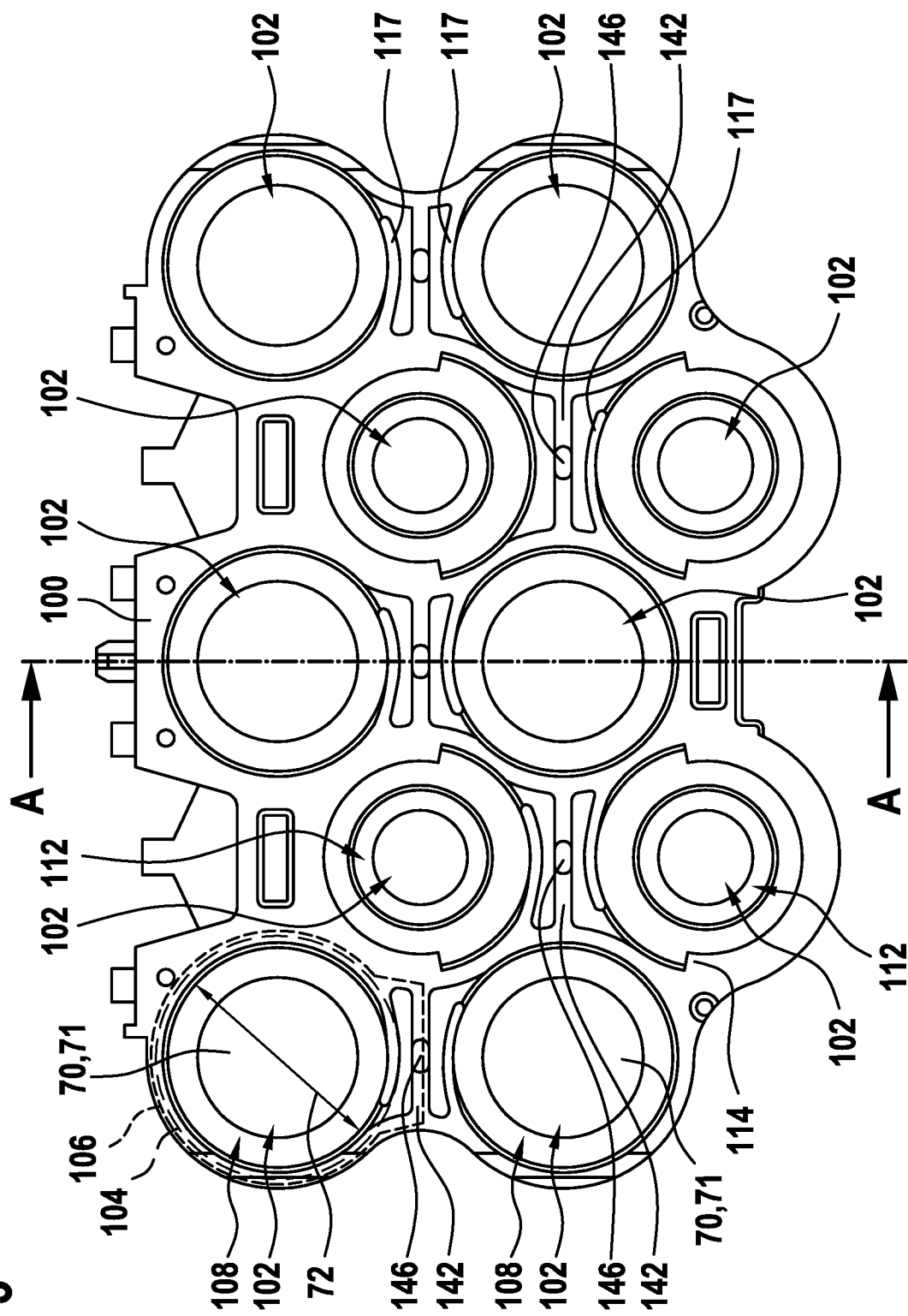
FIG. 3 shows a front view of a cell holder of the battery pack according to FIG. 2.

FIG. 3 shows a front view of the cell holder 100. The cell holder 100 exemplarily has ten battery-cell receivers 102. The cell holder 100 is exemplarily realized as a single piece. The battery-cell receivers 102 are each exemplarily designed to receive a single battery cell 70.

The battery cells 70 have a diameter 72 that is subject to a certain tolerance due to the production process. The battery cells 70 have different diameters 72.

The battery-cell receivers 102 each have a flexible region 104 and a rigid region 106, the flexible region 104 being arranged entirely within the rigid region 106. The battery cells 70 are arranged entirely within the flexible region 104. In particular, the flexible region 104 is realized in such a manner that it adapts to the size, or diameter 72, of the battery cells 70. In particular, the flexible region 104 is a part of the rigid region 106. Viewed in cross-section, the proportion of the flexible region 104 to the rigid region 106 is in particular in the range of from 75% to 95%, preferably 80% to 90%.

The battery-cell receivers 102 each have a first opening 108 via which the battery cell 70 can be connected to the battery-cell receiver 102 along a connection direction 110. The battery-cell receivers 102 each exemplarily have only one opening 108, such that the battery cells 70 can only be inserted into the cell holder 100 from one side. The openings 108 are arranged in such a manner that some of the battery cells 70 can be inserted from a first side and the rest of the battery cells 70 can be inserted from a second side, opposite the first side.

The battery cell receivers 102 each have a second opening 112 arranged opposite the first opening 108. The battery cells 70 cannot be received via the second opening 112. The second openings 112 are smaller in diameter than the openings 108. The second openings 112 have a stop element 114, which forms a stop for the battery cell 70 to be received. In the connected state, the battery cell 70 preferably bears against the stop element 114.

The first openings 108 and the second openings 112 are designed in particular for electrical contacting of the battery cells 70. In the connected state, the cell poles 71 of the battery cells 70 are connected to cell connectors 73 by a welding process. Individual cell connectors 73 in this case exemplarily bear against two or four battery cells 70. The battery cells 70 are connected to the power contacts 82 via the cell connectors 73.

Figure 4:
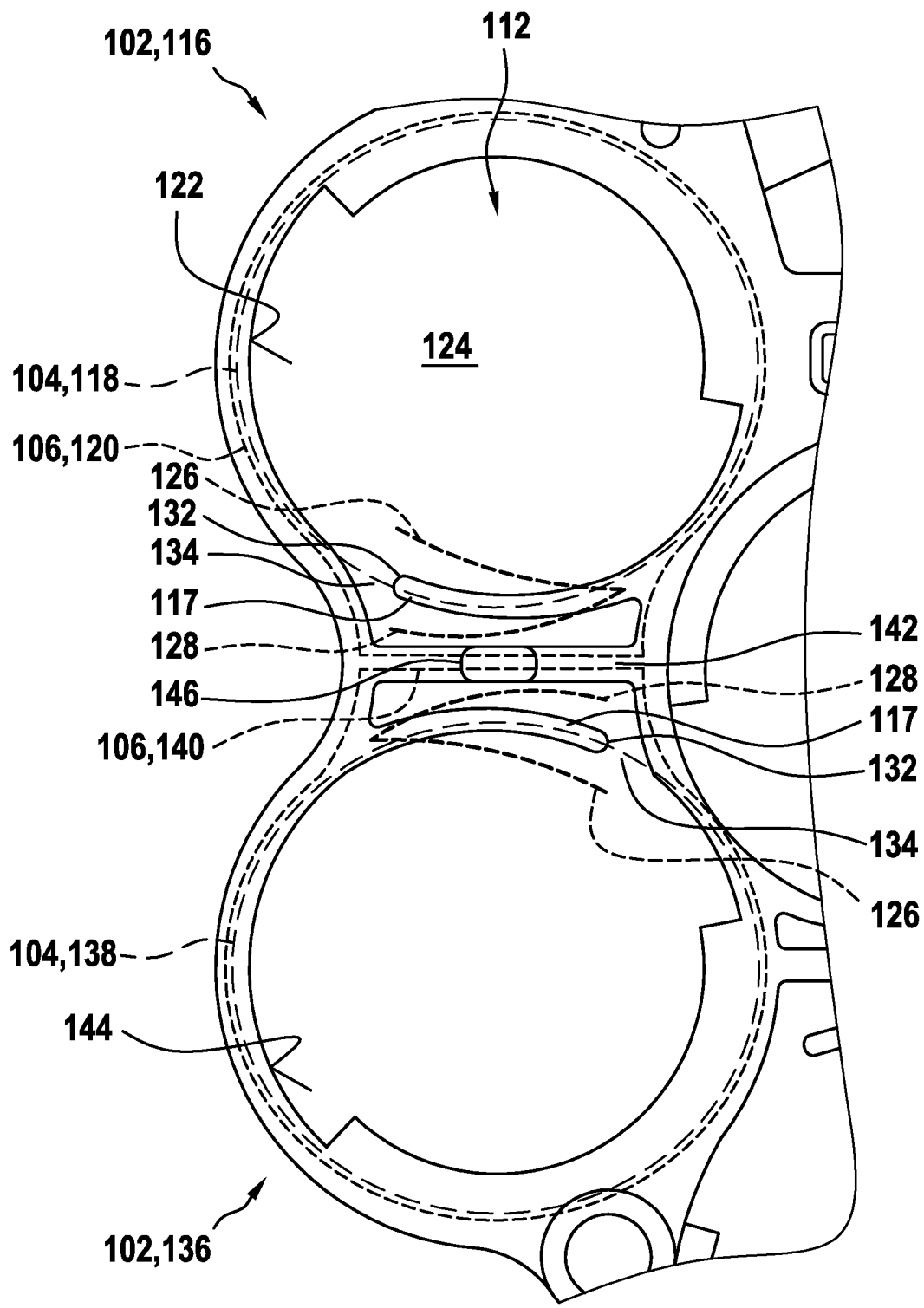
FIG. 4 shows a partial view of the cell holder according to FIG. 3.

In FIG. 4, two battery-cell receivers 102 of the cell holder 100 are shown in an enlarged view.

The first battery-cell receiver 116 has a first flexible region 118 and a first rigid region 120.

The first rigid region 120 is realized in such a manner that, as viewed in cross-section, the rigid region does not change in size, irrespective of the size of the battery cell 70 provided. The first rigid region 120 has an inner wall 122 that encloses a cavity 124, which is closed as viewed in cross-section.

For each battery-cell receiver 102, the cell holder 100 has at least one resilient arm 117. The resilient arm 117 is exemplarily realized as one piece with the cell holder 100, but it is also conceivable for it to be made of a different material and to be connected to the cell holder 100. The resilient arm 117 extends into the cavity 124 of the first rigid region 120.

The resilient arm 117 of the first battery-cell receiver 116 delimits the size of the first flexible region 118, as viewed in cross-section.

In FIG. 4, the resilient arm 117 is additionally indicated, by a dashed line, in a minimum position 126 and a maximum position 128. In the minimum position 126 of the resilient arm 117, the size of the first flexible region 118 is minimal. In particular, the resilient arm 117 is arranged in the minimum position when not connected to the battery cell 70. In the maximum position, the size of the first flexible region 118 is maximum.

The resilient arm 117 has a length that is preferably at least 25%, preferably at least 50%, of the diameter or radius of the battery cell 70 provided.

Furthermore, the resilient arm 117 comprises an open end 132 arranged adjacent the inner wall 122 of the first rigid region 120. Between the open end 132 and the inner wall 122, the battery cell receiver 102 has a gap 134 extending continuously from the first opening 108 to the second opening 112.

Arranged adjacent to the first battery-cell receiver 116 there is a second battery-cell receiver 136.

The second battery-cell receiver 136 has a second flexible region 138 and a second rigid region 140, which are substantially identical to those of the first battery-cell receiver 116.

The resilient arm 117 of the second battery-cell receiver 136 is realized substantially identically to the resilient arm 117 of the first battery-cell receiver 116, in particular with respect to a length, a thickness and a geometry, such that the resilient arms 117 have substantially the same force characteristics. The resilient arms 117 differ with respect to their positioning and orientation. In particular, the resilient arms 117 extend substantially parallel and in opposite directions to each other, such that the open ends 132 are arranged on different sides.

A support element 142 is arranged between the two resilient arms 117. The support element 142 delimits both the first rigid region 120 of the first battery-cell receiver 116 and the second rigid region 140 of the second battery-cell receiver 136. In particular, the support element 142 is part of the inner wall 122 of the first battery-cell receiver 116 and part of an inner wall 144 of the second battery-cell receiver 136.

The support element 142 is exemplarily realized as a flat wall. The support element 142 is preferably arranged in such a manner that a distance of the support element 142 from the resilient arm 117 of the first battery-cell receiver 116 substantially corresponds to a distance of the support element 142 from the resilient arm 117 of the second battery-cell receiver 136. The distance of the support element 142 from the resilient arm 117 in this case depends on the position of the resilient arm 117, or the size of the flexible region 104.

The support element 142 is in particular realized in such a manner that a deformation caused by a deformation of adjacent battery cell receivers 102 is substantially precluded. The support element 142 is exemplarily realized as a single piece with the cell holder 100. Alternatively, it is also conceivable for the support element 142 to be made of another component/material and to be connected to the cell holder 100. It is also conceivable for the support element 142 to be metallic, in particular realized as a metallic insert.

Figure 6:
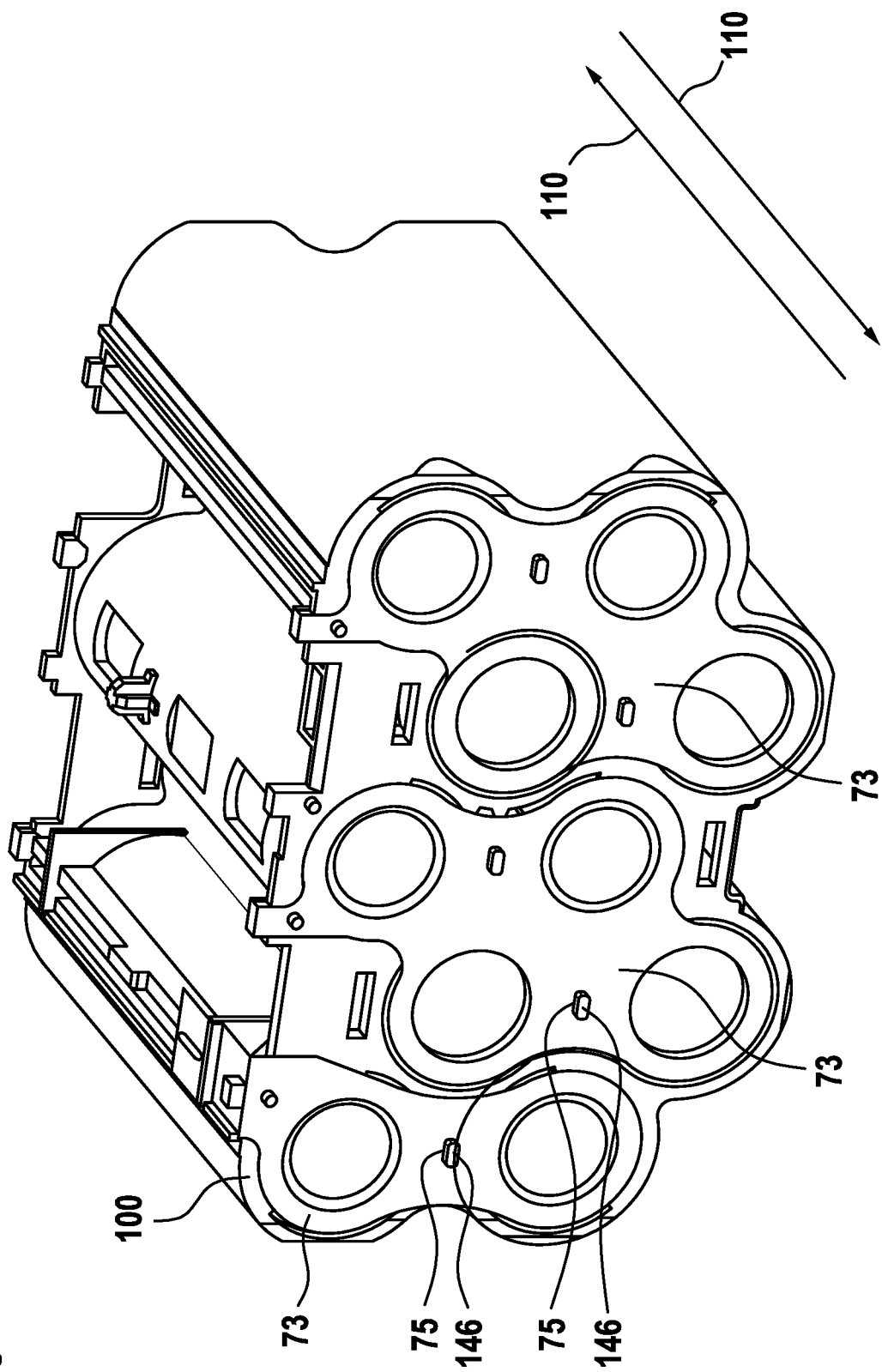
FIG. 6 shows a perspective view of the cell holder according to FIG. 3 connected to cell connectors.

The support element 142 also has a centering element 146, which is provided for centering the cell connector (see FIG. 6). The centering element 146 is exemplarily realized as a substantially rectangular extension that extends in the connection direction 110. In particular, the support element 142 has at least one centering element 146 on each of two different sides. Preferably, the distance between the centering elements 146 corresponds to the length of the support element 142 and the length of the cell holder 100.

Figure 5:
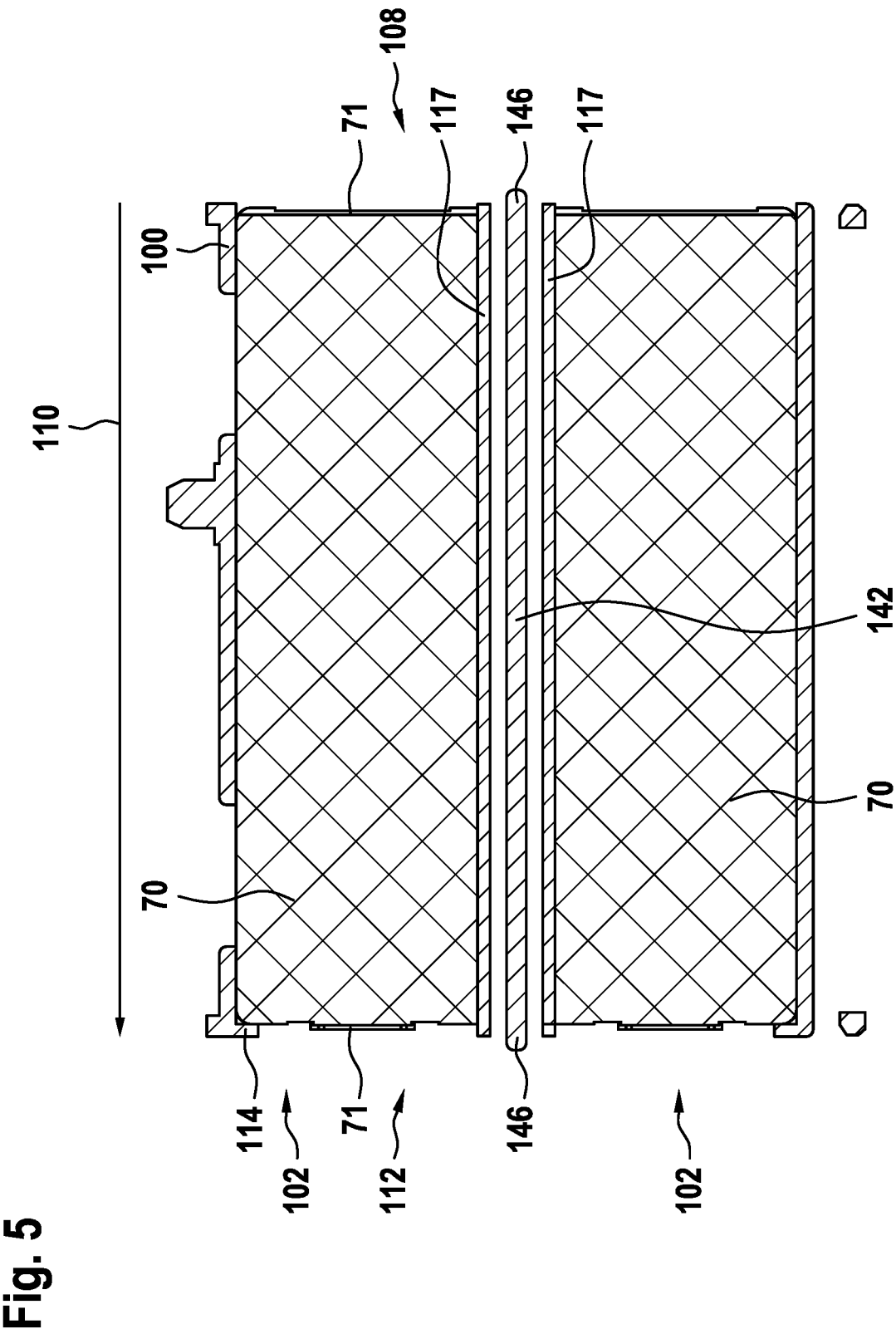
FIG. 5 shows a longitudinal section through the cell holder according to FIG. 3.

FIG. 5 shows a side section through the cell holder 100 with connected battery cells 70. The resilient arms 117 bear against an outer surface, or circumferential surface, of the battery cells 70, in particular over the entire length of the battery cells 70, and apply a radially inwardly directed force to them. The support element 142 is arranged at a distance from the battery cell 70. The distance in this case is substantially constant.

FIG. 6 shows a perspective view of the cell holder 100 with inserted battery cells 70, the battery cells 70 being electrically connected by means of cell connectors 73.

The cell connectors 73 each have at least one cut-out 75 in which the cell holder 100, in particular the support element 142, for example the centering 146 element, engages. The cut-outs 75 in this case are arranged centrally between two battery cells 70 that are to be connected.

Figure 7:
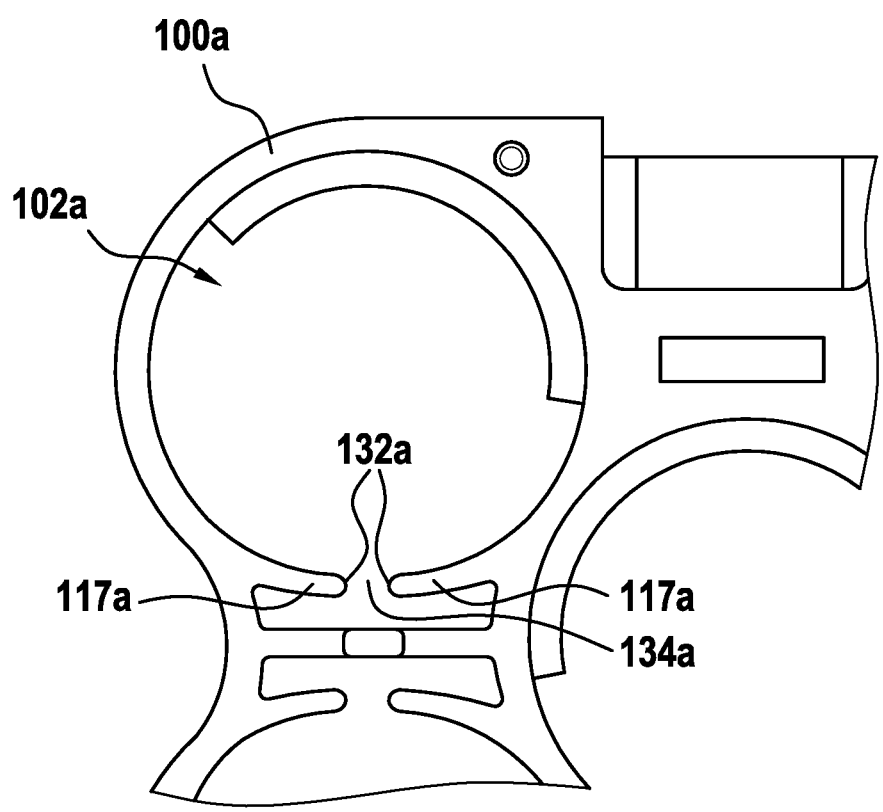
FIG. 7 shows an alternative embodiment of a cell holder.

FIG. 7 shows a partial view of an alternative embodiment of the cell holder 100. The cell holder 100a has two resilient arms 117a for each battery-cell receiver 102a. The resilient arms 117a have open ends 132a that are directed toward each other, such that the gap 134a is arranged between the resilient arms 117a.

What is claimed is:

1. A cell holder for at least two battery cells, comprising:
   at least two battery-cell receivers, each battery-cell receiver configured to receive a single battery cell, the at least two battery-cell receivers including:
      a first battery cell receiver having a first rigid region and a first flexible region arranged partially or entirely in the first rigid region, the first flexible region including a first resilient arm configured to frictionally fix the single battery cell of the first battery cell receiver; and
      a second battery cell receiver having a second rigid region and a second flexible region arranged partially or entirely in the second rigid region, the second flexible region including a second resilient arm configured to frictionally fix the single battery cell of the second battery cell receiver; and
   a support element arranged between the first and second flexible regions and configured to mechanically stiffen the first and second battery cell receivers,
   wherein each of the first and second resilient arms is spaced apart from the support element such that a respective cavity is defined between each of the first and second resilient arms and the support element, and a size of each respective cavity is dependent on a diameter of the single battery cell received in the associated one of the first and second battery cell receivers, and
   wherein the first flexible region and the first rigid region are configured as a single part or as a single piece.

2. The cell holder according to claim 1, wherein the support element is assigned to a first rigid region of the first battery-cell receiver and to a second rigid region of the second battery-cell receiver.

3. The cell holder according to claim 1, wherein a distance of the first and second resilient arms from the support element is based on the diameter of the single battery cell received in the associated one of the first and second battery cell receivers.

4. The cell holder according to claim 1, wherein the first and second battery-cell receivers each have an opening via which the single battery cell received in the associated one of the first and second battery cell receivers is received along a connection direction.

5. The cell holder according to claim 1, wherein the support element has a centering element for a cell connector on at least one end face.

6. A battery pack comprising:
   the cell holder according to claim 1; and
   at least two battery cells, the at least two battery cells including the single battery cell received in each of the at least two battery-cell receivers.

7. The battery pack according to claim 6, wherein in a connected state, the first and second resilient arms each bear against the single battery cell received in the associated one of the first and second battery cell receivers via a line contact.

8. The battery pack according to claim 6, wherein:
   the at least two battery-cell receivers each have an opening via which the associated single battery cells are received in the at least two battery-cell receivers along a connection direction, and
   the support element extends along the connection direction.

9. The battery pack according to claim 8, wherein the support element is arranged at a distance from a corresponding battery cell of the at least two battery cells.

10. The battery pack according to claim 6, wherein the first and second resilient arms have a circumferential length that is at least 25% of the diameter of the single battery cell.

11. The cell holder according to claim 1, wherein the first and second resilient arms are configured to pivot about a pivot axis between a minimum diameter position and a maximum diameter position, the size of the respective cavity being smallest in the maximum diameter position.

12. The cell holder according to claim 11, wherein the first and second resilient arms are positioned at the minimum diameter position in the absence of the single battery cell, and the single battery cell displaces the associated one of the first and second resilient arms toward the maximum diameter position such that the associated one of the first and second resilient arms exerts a radially inwardly directed force on the single battery cell.

13. A cell holder for at least two battery cells, comprising:
   at least two battery-cell receivers, each battery-cell receiver configured to receive a single battery cell, the at least two battery-cell receivers including:
      a first battery cell receiver having a first rigid region and a first flexible region arranged partially or entirely in the first rigid region, the first flexible region including a first resilient arm configured to frictionally fix the single battery cell of the first battery cell receiver; and
      a second battery cell receiver having a second rigid region and a second flexible region arranged partially or entirely in the second rigid region, the second flexible region including a second resilient arm configured to frictionally fix the single battery cell of the second battery cell receiver; and
   a support element arranged between the first and second flexible regions and configured to mechanically stiffen the first and second battery cell receivers,
   wherein each of the first and second resilient arms is spaced apart from the support element such that a respective cavity is defined between each of the first and second resilient arms and the support element, and a size of each respective cavity is dependent on a diameter of the single battery cell received in the associated one of the first and second battery cell receivers,
   wherein the first and second resilient arms are configured to pivot about a pivot axis between a minimum diameter position and a maximum diameter position, the size of the respective cavity being smallest in the maximum diameter position,
   wherein the first and second resilient arms are positioned at the minimum diameter position in the absence of the single battery cell, and the single battery cell displaces the associated one of the first and second resilient arms toward the maximum diameter position such that the associated one of the first and second resilient arms exerts a radially inwardly directed force on the single battery cell, and
   wherein the first and second resilient arms are circumferentially cantilevered such that a first circumferential end of the first and second resilient arms is supported by the respective first and second rigid region and a second opposite circumferential end of the first and second support arms is unsupported.

14. A cell holder for at least two battery cells, comprising:
at least two battery-cell receivers, each battery-cell receiver configured to receive a single battery cell, the at least two battery-cell receivers including:
  a first battery cell receiver having a first rigid region and a first flexible region arranged partially or entirely in the first rigid region, the first flexible region including a first resilient arm configured to frictionally fix the single battery cell of the first battery cell receiver; and
  a second battery cell receiver having a second rigid region and a second flexible region arranged partially or entirely in the second rigid region, the second flexible region including a second resilient arm configured to frictionally fix the single battery cell of the second battery cell receiver; and
a support element arranged between the first and second flexible regions and configured to mechanically stiffen the first and second battery cell receivers, wherein:
each of the first and second resilient arms is spaced apart from the support element such that a respective cavity is defined between each of the first and second resilient arms and the support element, and a size of each respective cavity is dependent on a diameter of the single battery cell received in the associated one of the first and second battery cell receivers,
the first and second resilient arms are configured to pivot about a pivot axis between a minimum diameter position and a maximum diameter position, the size of the respective cavity being smallest in the maximum diameter position,
the first and second resilient arms are positioned at the minimum diameter position in the absence of the single battery cell, and the single battery cell displaces the associated one of the first and second resilient arms toward the maximum diameter position such that the associated one of the first and second resilient arms exerts a radially inwardly directed force on the single battery cell, and
the first and second resilient arms extend axially along an entire length of the single battery cell received in the associated one of the first and second battery cell receivers.

15. The cell holder according to claim 14, wherein the first flexible region and the first rigid region are configured as a single part or as a single piece.

* * * * *